I. A. WESSON.
LINEAR MEASURE.
APPLICATION FILED APR. 8, 1911.

1,079,457.

Patented Nov. 25, 1913.

Witnesses
A. W. B. Bridges
B. B. Hills

Inventor
Isaac A. Wesson
By Edwin L. Jewell
his Attorney

UNITED STATES PATENT OFFICE.

ISAAC A. WESSON, OF WINGO, KENTUCKY.

LINEAR MEASURE.

1,079,457.  Specification of Letters Patent.  Patented Nov. 25, 1913.

Application filed April 8, 1911. Serial No. 619,919.

*To all whom it may concern:*

Be it known that I, ISAAC A. WESSON, a citizen of the United States, residing at Wingo, in the county of Graves and State of Kentucky, have invented certain new and useful Improvements in Linear Measures, of which the following is a specification.

This invention relates to certain improvements in linear measures and has for its particular object to provide a measure that will be useful to persons who trade in live stock.

Another object is to provide a measure that is flexible whereby circular bodies can be measured and at the same time capable of resuming its normal position in an approximately straight line.

A further object is to provide such a device that is especially adapted to be carried in vehicles without folding.

Figure 1:
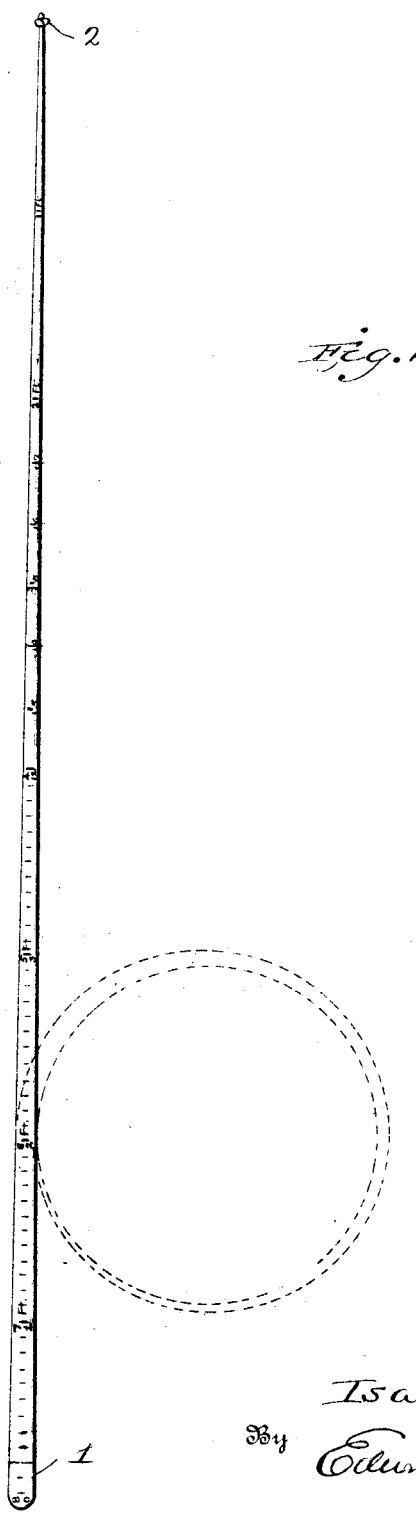
Figure 2:
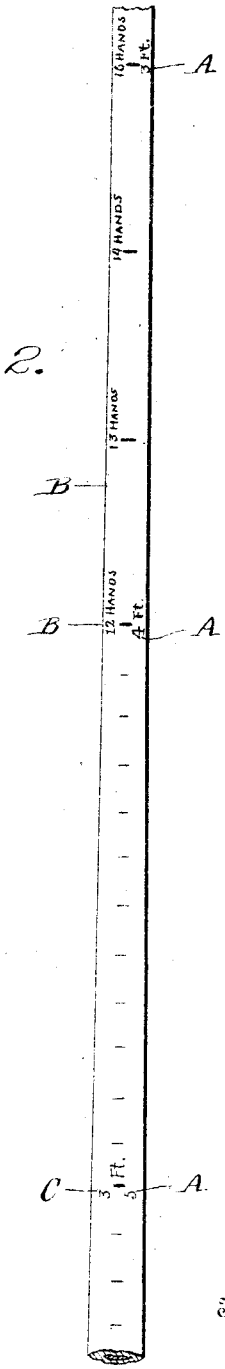

These objects and others hereinafter set forth are attained by the means illustrated in the accompanying drawing, in which:

Figure 1 is a view of my improved device, showing in full lines its normal position and in dotted lines how it can be bent, and Fig. 2 is an enlarged detail view of a short section thereof intermediate its ends.

Similar reference numerals in the several views of the drawing indicate like parts.

The device is preferably formed tapering from base to tip, provided with a ferrule 1 on its base or butt end, a knot or button 2 at its tip end, and is constructed preferably circular in cross-section and made from rawhide, whale-bone or other suitable resilient flexible material or a core of these materials can be formed and covered with other suitable flexible material. In some instances a core of steel wire upon which is threaded a series of disks can be used.

Upon the body of the measure a series of scales are printed, pasted or otherwise affixed, said scales extending from one end of the measure to the other. As illustrated, the measure is assumed to be eight feet in length from one end to the other, gradually tapering from a base or butt which in reality is approximately one-half or three-quarters of an inch in diameter, but in the drawing is shown somewhat exaggerated and is divided into eight equal parts, each part representing one foot and the same are indicated by suitable marks and numerals. The preferred form of placing the numerals upon the measure consists of starting from the knot or button at the tip end as zero, marking the foot lengths 1, 2, 3, etc., as indicated at A, toward the butt or base end, which would represent eight feet. At the four foot mark, which is midway of the measure, is commenced another scale B, extending toward the tip end, divided into four inch divisions, or hands, and starting at the base or butt end as zero and extending to said four foot mark, the foot divisions are further indicated by another set of numerals C from one to four, said divisions at this butt end of the measure being subdivided into inches.

From the foregoing description, it will be seen that the measure is constructed to simulate a whip, of the character that is usually carried in vehicles in whip-sockets, and in which the above described measure can also be carried, and as it is constructed with materials from which whips are made, it can also be used as such. Furthermore by forming the measure circular in cross-section and of decreasing diameters toward one end, the material of which it is constructed is capable of sustaining it in an approximately straight line whereby it can be carried in a whip-socket, also will allow of its bending in any direction and providing a relatively rigid base or butt which is adapted for measuring short lengths, and a light flexible end that can be used to measure circular bodies. Measures of the usual construction of this length, viz., those that are rigid enough to retain a straight line and formed of equal diameters throughout are heavy and unwieldy, and cannot be conveniently used by grasping one end thereof, while with the construction described no inconvenience whatever is had.

In measuring the heights of animals the measure is grasped at or near the small end, allowing the base or butt to rest upon the ground or platform upon which the animal is standing, and sighting across the back of the animal the number of hands will be indicated on the measure, and as is shown in dotted lines in Fig. 1, the girth of the animal can be measured by passing the tip end of the measure therearound. In other words, the scale advancing from the tip end is applicable to round bodies, and the scale running in the opposite direction to straight lengths.

Having thus fully described the invention, what is claimed is:

A tapering resilient measure circular in cross-section provided with indices throughout its length, foot indicating characters adjacent to said indices progressively increasing numerically from the small to the large end of said measure, foot indicating characters adjacent to the same indices increasing numerically from the large end to an intermediate portion of said measure, the scale at the larger end of said measure being subdivided with indices representing inches, the scale upon an intermediate portion being subdivided with indices representing hand measures, and hand indicating characters adjacent said hand indices and progressively increasing numerically from the larger portion of said measure.

In testimony whereof I affix my signature in presence of two witnesses.

ISAAC A. WESSON.

Witnesses:
J. H. ROBERTSON,
A. O. COLEMAN.